3,396,266
OPTICAL INFORMATION READ-OUT SYSTEM
Erhard Max, Wappingers Falls, and Glenn T. Sincerbox, Poughkeepsie, N.Y., assignors to International Business Machines Corporation, New York, N.Y., a corporation of New York
Filed May 25, 1964, Ser. No. 369,741
7 Claims. (Cl. 235—61.11)

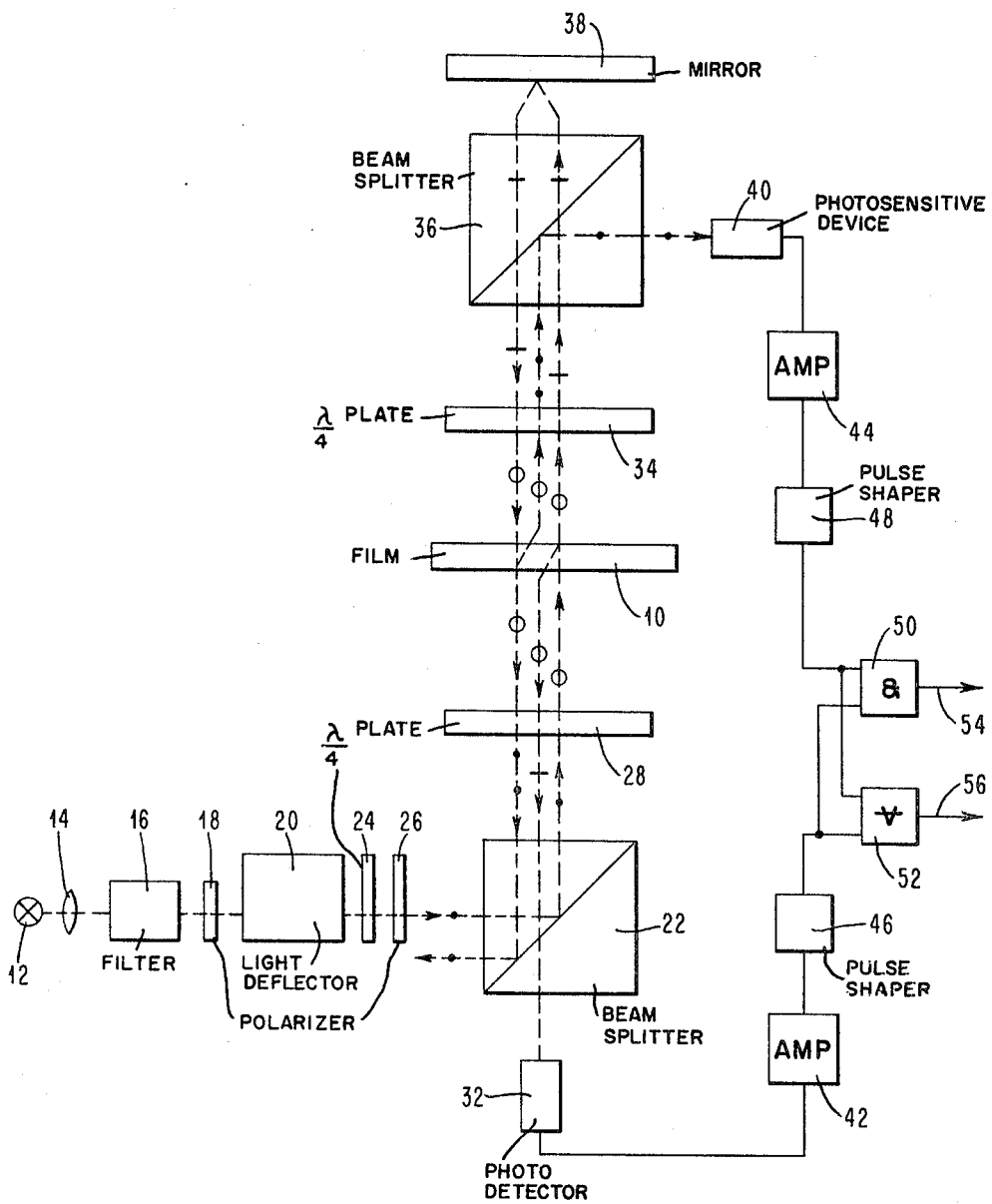

ABSTRACT OF THE DISCLOSURE

Apparatus is provided for optically reading out stored information by using reflected light. The apparatus provides two output beams of reflected light from the surface storing the information in the form of reflecting layers. Light accessing means is employed for twice interrogating a storage area on a film with the same beam so that separate outputs are provided for each interrogation. The outputs are either compared for error detection purposes or combined in order to obtain an output signal having greater intensity.

---

This invention relates to mechanisms for reading stored information by means of reflected light, and more particularly to mechanisms whilh provide two output beams of reflected light from surfaces established as a representation of stored information.

There is described in a United States patent application Ser. No. 332,755, filed Dec. 23, 1963, by Harold Fleisher et al., apparatus for producing thin layers of reflecting material spaced at periodic intervals in a transparent film as a representation of information to be stored. The layers are formed by directing light against a photographically sensitive emulsion and reflecting the same light back through the emulsion. A standing wave is set up for each monochromatic light frequency, and the emulsion is modified at the antinodes of the standing waves so that, after processing and fixing, a plurality of light scattering layers are formed in depth in the film spaced at periodic intervals for each anharmonic frequency of information stored therein.

When light is directed against a film in which reflecting layers had previously been formed, a coherent reflective scattering is obtained if the light is of the same frequency as that which resulted in the original formation of the layers. Light of different frequencies will not be coherently reflected. This light is reflected incoherently from each of the many partially reflecting layers, resulting in a considerably reduced intensity relative to the coherent reflected light of a recorded anharmonic frequency in the given storage area. The reflection of coherent light from any point in the storage area, due to the presence of information stored at that point, may cause a light sensitive device to emit an electric pulse which may be used in any manner desired.

Part of the light directed against a film in which information is stored passes through the film. If this light is now directed back upon the same part of film through which it passed, the stored information again causes a reflection of coherent light which may cause a second light responsive device to emit an electric pulse. This pulse may either be combined with that resulting from the first reflection of light to give an increased output signal or it may be used to check the accuracy of the first reading. A pulse obtained from one of the devices and not from the other would indicate an error.

An object of this invention is to provide an improved mechanism for reading stored information.

Another object is to provide an improved mechanism for reading information stored in a film in the form of reflecting layers spaced from each other at periodic intervals.

Still another object is to provide a mechanism which is operable to produce two output beams of reflected light as a result of reading information stored in a film in the form of reflecting layers, the output beams being subject either to comparison for indicating accuracy of operation or to combined action for producing an increased output signal.

Yet another object is to provide improved mechanisms for producing two output signals as a result of reading, by a single light beam, information stored in a film in the form of reflecting layers.

The foregoing and other objects, features and advantages of the present invention will be apparent from the following more particular description of the preferred embodiments of the invention as illustrated in the accompanying drawing.

The drawing is a schematic illustration of a system which produces two output signals in response to the reading of information in a film by a single light beam.

As shown in the drawing, a film 10 of transparent material has information stored therein in the form of light reflecting layers which are spaced from each other distances depending on the frequency of the light to which the film had previously been exposed. If a single spot on the film had been exposed to light of a given frequency, then reflecting layers would be present at periodic intervals which are in direct proportion to that light frequency. If the same spot had been subjected to light of other frequencies, then other reflecting layers would also be present at points spaced in proportion to such frequencies. When light is directed upon the film at a frequency equal to any one of the frequencies which caused a formation of reflecting layers, a reflection of coherent light is obtained. By subjecting a storage area on the film to light of different frequencies and noting those at which coherent light is reflected, it is possible to determine different bits of information stored within the same area. Means to be described are provided for causing a single interrogating light beam to read a storage area on the film twice and give a separate output for each reading so it is possible either to compare the outputs for obtaining an error detection or to combine the outputs for obtaining greater output intensity.

An interrogating light beam of any desired frequency is obtained by directing light containing all frequencies which may have been used in storing information, from a source 12 through a collimating lens 14 to a controllable filter 16. Light of a selected frequency passes from the filter 16 through a polarizer 18 to a light deflector 20 like that described in patent application Ser. No. 285,832, filed June 5, 1963, by T. J. Harris et al. The light passes from the deflector as indicated over any one of a plurality of parallel paths depending on the operation of the deflector and is linearly polarized either in a direction parallel to the plane of the drawing or perpendicular to this plane. Arranged in the light path is a beam splitter 22 from which the light is deflected upwardly. In order that this deflection may take place, the light entering the beam splitter is linearly polarized in a plane perpendicular to that of the drawing. To assure that the polarization is in this plane, a quarter-wave plate 24 is arranged at the output side of the deflector 20 for changing the polarization from plane to circular. The light then passes through a polarizer 26 which changes the polarization again to that indicated.

From the beam splitter 22, the light passes upwardly polarized in a plane perpendicular to the drawing and enters a quarter-wave plate 28 which changes its polarization to circular. This light then enters the film 10 and, if its frequency is equal to that represented by reflecting layers within the film, some of the light is reflected back through the quarter-wave plate 28 which then causes the light to become linearly polarized in a plane parallel to the plane of the drawing. The light polarized in this direction passes straight through the beam splitter to a photo-detector 32 and causes the latter to emit an electric pulse.

All of the light not reflected back at the film 10 passes on through another quarter-wave plate 34 which changes the polarization from circular to linear in a plane parallel to the plane of the drawing. The light with this polarization passes through another beam splitter 36 to a mirror 38 which reflects the light back through the beam splitter 36 and the quatrer-wave plate 34 to the film 10. As the light passes through the plate 34, it becomes circularly polarized again and some of it is reflected from the film 10 toward the plate 34 by the same layers which reflected light toward the plate 28 during the first pass through the film. Light reflected back toward the plate 34 passes through the latter and is polarized in a direction to be deflected by the beam splitter 36 to a photo-sensitive device 40 which emits a pulse when activated. All of the light not reflected back to the plate 34 passes through the film 10 and the quarter-wave plate 28 to the beam splitter 22. As the light passes through the plate 28 is becomes linearly polarized in a plane perpendicular to the drawing so it is deflected by the beam splitter 22 out of the path to the photo-detector 32.

In order to determine whether or not the information in the film 10 was read correctly on each pass of the light through the film, the photo-detectors 32 and 40 are connected, respectively, through amplifiers 42, 44 and pulse shapers 46, 48 to both an "and" circuit 50 and an "exclusive or" circuit 52. When both of the photo-detectors are activated, indicating an agreement in the reading of stored information, a read-out signal is obtained on the output 54 from the "and" circuit. If only one of the photo-detectors is activated, indicating a disagreement in the reading of information, no read-out signal is obtained at 54 but an error signal is obtained at 56 from the "exclusive or" circuit 52. The absence of both a read-out signal and an error signal indicates that no information was read from the film.

With the deflector 20 adjusted to direct light to a selected point on the film 10, the filter 16 may be operated to pass light of different frequencies while the outputs of the circuits 50 and 52 are observed as an indication of the stored information. Having tested one point for information, the deflector 20 may be actuated to direct a light beam to any other area to be read. Any suitable means may be provided, if desired, to operate in response to signals received from the circuits 50, 52 for indicating either a reading of information or a disagreement in the reading of information.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for reading from a transparent material information stored therein in the form of light reflecting layers at spacings corresponding to a given light frequency comprising, in combination, first and second beam splitters arranged at opposite sides of said transparent material, first and second quarter-wave plates, one located between each of said beam splitters and said transparent material, means for directing a beam of linearly polarized light at a selected frequency through said first beam splitter and said first quarter-wave plate to said transparent material, said layers operating, if their spacings correspond to the frequency of said light, to reflect part of the light back to said first beam splitter, the remainder of the light passing through said second quarter-wave plate and said second beam splitter, a mirror arranged adjacent said second beam splitter for reflecting the light back through it and said second quarter-wave plate to said transparent material, said layers again reflecting part of the light back to said second beam splitter, and means arranged adjacent each of said beam splitters for receiving light reflected from said layers and providing an indication that such light has been received.

2. The apparatus of claim 1 in which said last-mentioned means comprises photo-detectors, each of which operates to emit an electric pulse when subjected to light.

3. The apparatus of claim 1 in which said last-mentioned means comprises a photo-detector arranged adjacent each beam splitter and operating to emit an electric pulse when subjected to light, and means including an "and" circuit connected to said photo-detectors for producing an output pulse when subjected to a pulse from each of the latter.

4. The apparatus of claim 1 in which said last-mentioned means comprises a photo-detector arranged adjacent each beam splitter and operating to emit an electric pulse when subjected to light, and means including an "or" circuit connected to said photo-detectors for producing an output pulse when subjected to a pulse from one of said detectors and not the other.

5. The apparatus of claim 1 in which said last-mentioned means includes a photo-detector arranged adjacent each beam splitter and operating to emit an electric pulse when subjected to light, an "and" circuit, an "or" circuit, and means connecting said photo-detectors to both said "and" circuit and said "or" circuit whereby an output pulse is obtained from either one or the other when either one or both of said photo-detectors are subjected to light.

6. The apparatus of claim 1 in which said light directing means includes a light deflector which is operable to direct the light beam to any desired portion of said transparent material for reading information stored therein.

7. The apparatus of claim 6 including a quarter-wave plate and a polarizer arranged between said light deflector and said first beam splitter, said quarter-wave plate operating to change the polarization of the light from said deflector to circular, and said polarizer operating to pass only light linearly polarized in a given plane to said beam splitter.

No references cited.

MAYNARD R. WILBUR, *Primary Examiner.*

J. I. SCHNEIDER, *Assistant Examiner.*